(No Model.)
J. BUSCH.
COOLER FOR BEVERAGES.
No. 528,463. Patented Oct. 30, 1894.
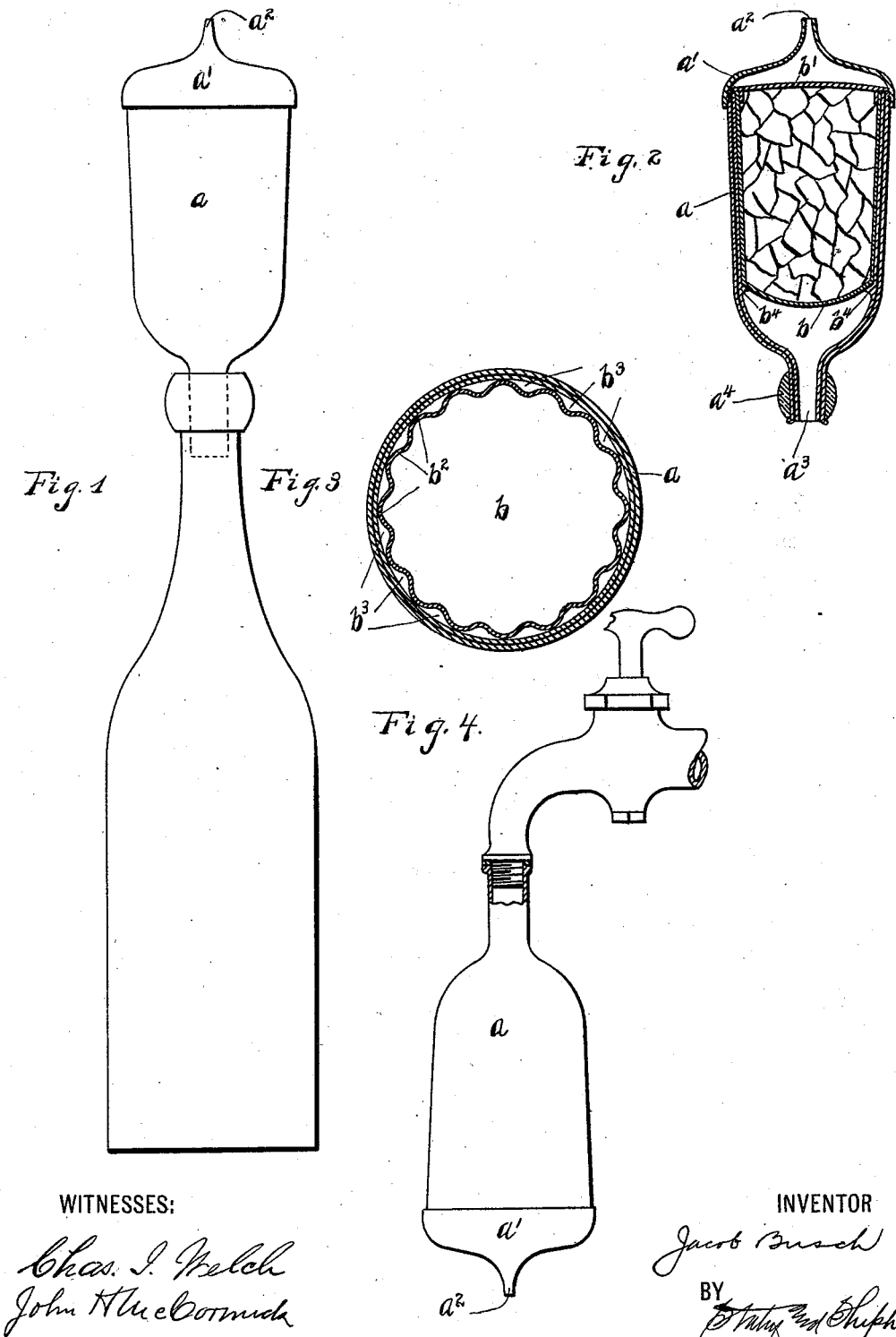
WITNESSES:
Chas. J. Welch
John H. McCormick
INVENTOR
Jacob Busch
BY
Philip End Shepherd
ATTORNEYS

UNITED STATES PATENT OFFICE.

JACOB BUSCH, OF SPRINGFIELD, OHIO.

COOLER FOR BEVERAGES.

SPECIFICATION forming part of Letters Patent No. 528,463, dated October 30, 1894.

Application filed February 23, 1894. Serial No. 501,070. (No model.)

*To all whom it may concern:*

Be it known that I, JACOB BUSCH, a citizen of the United States, residing at Springfield, in the county of Clark and State of Ohio, have invented certain new and useful Improvements in Coolers, of which the following is a specification.

My invention relates to a device for cooling liquids, and it specially relates to a device of simple and portable construction adapted to cool liquids drawn from bottles, casks, or through faucets or any source of supply.

My invention consists in the various constructions and combinations of parts hereinafter described and set forth in the claims.

In the accompanying drawings, Figure 1 is a side elevation of a device embodying my invention shown attached to an ordinary bottle. Fig. 2 is a longitudinal sectional elevation of the same detached. Fig. 3 is a transverse sectional view of the same, and Fig. 4 is a side elevation showing the device attached to a faucet with a slight modification in the construction for this purpose.

Similar letters refer to similar parts in the several views.

In the said drawings, $a$ represents an outer casing which may be made of any suitable material, it being preferably constructed wholly or in part of non-conducting material so as to prevent the heat from passing to the interior. This outer casing is provided at one end with a removable cover $a'$, and having in the cover a suitable opening $a^2$, a similar opening $a^3$ being arranged at the opposite end.

Within the outer casing is an inner receptacle $b$, formed of a size sufficient to fit in said outer casing so as to leave a space between the respective walls of the different parts. This inner receptacle $b$ is also provided with a removable cover $b'$ and is preferably formed on the sides with corrugations or flutes $b^2$, adapted to produce a series of longitudinal recesses or conduits $b^3$ around the inner receptacle and between the same and the outer casing.

In use, the inner receptacle is filled with broken ice, or other refrigerating material. The respective outlet and inlet openings may be formed in any desired shape so as to adapt the device to the particular use to which it is to be put. In Figs. 1 and 2, I have shown the opening $a^2$ through the cover formed in the nature of a nipple adapted to act as an outlet, while the opposite opening $a^3$ is formed with a neck having a washer $a^4$ of rubber, or other similar material, adapted to fit firmly in the mouth of a bottle, faucet, or other device.

The inner receptacle $b$ may be secured in the outer receptacle by suitable projecting lugs $b^4$, connected to the respective parts, or it may be formed so that said projections rest loosely against one of the parts so that the inner receptacle will be removable for cleaning, but held in place when the cover $a'$ is secured to the outer casing.

In Fig. 4 I have shown the neck screw-threaded and adapted to screw onto a faucet or cock.

It is quite obvious that these constructions may be variously modified.

The device is especially adapted for use in saloons, or for family use, for cooling beer, wine or other liquids without bringing the same in contact with the ice or other cooling material. By filling the receptacle with ice and placing one end in a bottle, as shown in Fig. 1, the liquid in the bottle will be deflected by the bottom of the inner receptacle through the respective conduits or passages, and thus subdivided and brought into direct contact with the cool surface of said device so as to thoroughly cool the liquid passing through. As the bottle is turned to its normal position all the liquid within the cooler drains back into the bottle and thus leaves the same free from any of said liquid, which may be contaminated by remaining in the cooler.

Having thus described my invention, I claim—

1. A cooling device having an outer casing with openings at each end thereof, and an inner receptacle arranged within the outer casing with a space between the same, removable covers for the respective casings, and means, as described, for attaching said cooler to the discharge outlet of any suitable vessel, substantially as specified.

2. A cooler consisting of an outer casing and an inner receptacle, and a removable cover for the respective parts, and outlet and inlet openings for said outer casing, said inner receptacle being provided with corrugated sides adapted to form grooves or passages for the liquid, substantially as specified.

3. An outer casing formed with outlet and inlet openings, and a removable cover, as described, an inner receptacle having corrugated sides and a curved top and bottom adapted to form deflectors for the liquid, substantially as specified.

In testimony whereof I have hereunto set my hand this 19th day of February, A. D. 1894.

JACOB BUSCH.

Witnesses:
    OLIVER H. MILLER,
    CHAS. I. WELCH.